(12) United States Patent
Hui et al.

(10) Patent No.: US 10,790,666 B2
(45) Date of Patent: Sep. 29, 2020

(54) POWER COMPENSATOR

(71) Applicants: Versitech Limited, Hong Kong (CN); Imperial Innovations Limited, London (GB)

(72) Inventors: Shu Yuen Ron Hui, Hong Kong (CN); Balarko Chaudhuri, London (GB); Chi Kwan Lee, Hong Kong (CN); Nilanjan Ray Chaudhuri, New York, NY (US)

(73) Assignees: Versitech Limited, Hong Kong (CN); Imperial Innovations Limited, London (GB)

(*) Notice: Subject to any disclaimer, the term of this patent is extended or adjusted under 35 U.S.C. 154(b) by 478 days.

(21) Appl. No.: 14/391,956

(22) PCT Filed: Apr. 9, 2013

(86) PCT No.: PCT/EP2013/057411
§ 371 (c)(1),
(2) Date: Oct. 10, 2014

(87) PCT Pub. No.: WO2013/153075
PCT Pub. Date: Oct. 17, 2013

(65) Prior Publication Data
US 2015/0115905 A1  Apr. 30, 2015

(30) Foreign Application Priority Data
Apr. 10, 2012 (GB) .................................. 1206318.6

(51) Int. Cl.
*H02J 3/18* (2006.01)
*H02J 3/24* (2006.01)

(52) U.S. Cl.
CPC .............. *H02J 3/18* (2013.01); *H02J 3/1814* (2013.01); *H02J 3/24* (2013.01); *Y02E 40/18* (2013.01); *Y02E 40/30* (2013.01)

(58) Field of Classification Search
CPC .... H02M 5/4585; H02M 5/458; H02M 5/447; H02M 5/45; H02M 5/4505; H02M 5/005;
(Continued)

(56) References Cited

U.S. PATENT DOCUMENTS

| 6,043,999 A * | 3/2000 | Ehrenberg | ............ H02J 3/1828 |
| | | | 363/125 |
| 6,566,764 B2 * | 5/2003 | Rebsdorf | ................ H02P 9/007 |
| | | | 290/44 |

(Continued)

FOREIGN PATENT DOCUMENTS

| EP | 1737098 A1 | 12/2006 |
| GB | 2 405 540 B | 5/2006 |

(Continued)

OTHER PUBLICATIONS

International Search Report in International Application No. PCT/EP2013/057411, filed Apr. 9, 2013.
(Continued)

*Primary Examiner* — Adolf D Berhane
*Assistant Examiner* — Kevin H Sprenger
(74) *Attorney, Agent, or Firm* — Saliwanchik, Lloyd & Eisenschenk

(57) ABSTRACT

A power compensator for compensating voltage at a location along a power transmission line, the compensator having a controller for controlling a voltage generated across the compensator, wherein the voltage is controlled to maintain a power transmission line voltage at a value dependent on the power transmission line location.

18 Claims, 13 Drawing Sheets

(58) Field of Classification Search
CPC ............ H02M 1/12; H02M 1/06; H02M 1/32;
H02M 1/4208; H02M 7/7575; H02M
7/06; H02M 7/068; H02M 7/10; H02M
7/217; H02M 7/219; H02M 7/537; H02M
7/003; H02M 7/5387; H02M 7/538;
H02M 7/53871; H02M 3/135; H02M
3/137; H02M 3/10; H02M 3/157; H02M
3/1584; H02M 3/33592; H02M 3/33523;
Y02B 70/126; Y02B 70/1475; Y02B
70/1441; H02J 9/062; H02J 3/18; H02J
3/36; H02J 3/24; H02J 3/1814; H02H
7/268; Y02E 40/30; Y02E 40/18
USPC ...................... 363/34–37, 123–127, 131–132
See application file for complete search history.

(56) References Cited

U.S. PATENT DOCUMENTS

| 7,301,787 | B2* | 11/2007 | Wu | ........................... | H02J 3/01 |
| | | | | | 307/105 |
| 2005/0002210 | A1* | 1/2005 | Moon | ...................... | B60L 11/14 |
| | | | | | 363/37 |
| 2007/0057640 | A1 | 3/2007 | Chung et al. | | |
| 2009/0251111 | A1* | 10/2009 | Choy | ........................ | H02J 3/18 |
| | | | | | 322/20 |
| 2010/0226157 | A1* | 9/2010 | Ohnishi | .............. | H02M 5/4585 |
| | | | | | 363/131 |
| 2012/0080420 | A1 | 4/2012 | Hui et al. | | |
| 2013/0082636 | A1* | 4/2013 | Ohori | ........................ | H02P 4/00 |
| | | | | | 318/723 |
| 2018/0026550 | A1* | 1/2018 | Dent | ....................... | H02J 3/383 |
| | | | | | 363/56.01 |

FOREIGN PATENT DOCUMENTS

| WO | WO-99/45623 | A1 | 9/1999 |
| WO | WO-03/098771 | A1 | 11/2003 |

OTHER PUBLICATIONS

De Brabandere K., et al. "A Voltage and Frequency Droop Control Method for Parallel Inverters", IEEE Transactions on Power Electronics, IEEE Service Center, Piscataway, NJ. vol. 22:4, Jul. 1, 2007, pp. 1107-1115.

Leonhard, W. "Electrical engineering between energy and information", Power Electronics and Motion Control Conference, 2000. Proceedings. PI EMC 2000. The Third International Aug. 15-18, 2000, Piscataway, NJ. vol. 1, Aug. 15, 2000, pp. 197-202.

Weedy, B.W. et al., "Control of Power and Frequency", *Electric Power Systems*, 1998, 4$^{th}$ Edition :pp. 163-171, Wiley, New York.

* cited by examiner

POWER COMPENSATOR

CROSS-REFERENCE TO RELATED APPLICATIONS

This application is the U.S. national stage application of International Patent Application No. PCT/EP2013/057411, filed Apr. 9, 2013, which claims priority to United Kingdom Application No. 1206318.6, filed Apr. 10, 2012, the disclosures of each of which are incorporated herein by reference in their entirety.

The present invention relates to a power compensator.

BACKGROUND OF THE INVENTION

In traditional power systems, the power flow is controlled by the power generation plants and the rate of power generation follows the load demand of the cities. In future power grids, more and more renewable energy sources will be installed in a distributed manner all over the cities (and thus all over the power grids). Since it is difficult to determine the total rate of power generation of renewable power sources such as wind and solar energy systems, the increasing use of intermittent renewable energy sources is expected to introduce dynamic instability to the ac power supply or commonly called ac mains. In future power grids, the control paradigm has to be changed so that, instead of having the power generation following the load demand as in the case of traditional power systems, the load demand should follow the power generation.

For voltage compensation, reactive power controllers have been proposed for supporting voltage along transmission lines. FIG. 1a illustrates the basic principle of using a reactive power controller (100) as a series reactive power compensator (controller). When power is transmitted from the power source (102) along the transmission line (104), due to the voltage drop across the winding impedance (106) and resistance (108), the output voltage $V_2$ is smaller than the input voltage $V_1$. Series reactive power controller can be inserted in the output of the transmission line. By generating a compensating voltage $V_{comp}$, the new output $V_2'$ can be increased to compensate the voltage drop of the power transmission along the transmission lines. In order not to consume power, the voltage vector of the compensating voltage generated by the reactive power controller is perpendicular to the current of the power flow, as indicated in the vector diagram of FIG. 1b in which Vector of $V_{comp}$ is perpendicular to the resistive voltage drop IR (which has the same direction of the current vector I). The use of reactive power controller or compensator to boost the output voltage is a prior art. It should however be noted that, in such prior art, it is the output voltage of the reactive power controller (i.e. the output voltage $V_2'$) that is regulated.

Reactive power controllers will be known to the skilled reader and are power electronics circuits that contain electronic switches and energy storage elements (such as inductors and/or capacitors). They can be used to utilize the storage energy to control the current and voltage in power systems. Referring to FIG. 2, examples of the usage of reactive power controllers 200 include series reactive power compensator 202, shunt (parallel) reactive power compensator 204 and the unified power flow controller (which uses the combination of series and shunt reactive power controllers). For high-power high-voltage applications (e.g. >11 kV), isolation transformers are usually used to provide electrical isolation between the high-voltage transmission lines and the electronic circuits of the reactive power controllers as shown in FIG. 2. However, for applications at the mains voltage of 110V or 230V, isolation transformers are not compulsory. For example, as shown in FIG. 3, series reactive power controller 300 proposed in patents [GB2405540.B and US patent US2007057640] has been used as a central dimming system for lighting system 306 fed by mains voltage without using isolation transformer. Such use of reactive power controller 302 once again regulates the output voltage of the series reactive controller using a standard "output voltage feedback control".

In traditional uses of series copy reactive power controllers for voltage regulation, the output voltage of the power controller is usually regulated. Such "output voltage control" is common and its control scheme is illustrated in FIG. 3, in which the output voltage $V_0$ is regulated to a reference voltage $V_0^*$ with the help of traditional "output feedback control".

However, in further developments it has recently been pointed out in a patent application by HUI, LEE and WU [U.S. patent application, 61/389,489, "Power Control Circuit and Method for Stabilizing a Power Supply" and a PCT application claiming priority therefrom] which are incorporated level by reference in their entirety that, if the "output voltage control of $V_0$" is changed to "input voltage control of $V_S$" as shown in FIG. 4, the subtle change in the control loop can offer novel features of the reactive power controller 400, which includes (i) the regulation of the input voltage $V_S$, (ii) the allowance for the output voltage $V_0$ to fluctuate so that the load power in the output load ($R_1$) can follow the power profile available from the ac power source that provides the mains voltage.

In particular, as can be seen in FIG. 4, the power line voltage Vs comprises the control variable to a controller 402 providing an input to a pulse width modulated (PWM) generator 406 in conjunction with a synchronization network input 408 to a pulse width modulator inverter 410 such that the voltage V0 fluctuates allowing power in the non-critical load 412 to vary such that the voltage Vs can be maintained constant. Since the reactive power controller with input voltage control can provide voltage support for the ac mains, it is called "voltage spring" or "electric spring". The difference of the traditional output control for voltage support in transmission lines (FIG. 5a) and for central dimming system (FIG. 5b) is illustrated in circuit diagrams and compared with the input voltage control for the controller in FIG. 5c. For example in FIG. 5a series reactive power compensation for output voltage support is shown regulated by the output voltage V0 whereas in FIG. 5b series reactive power compensation for dimming lighting load in relation to the active power flow 500 is shown regulated by V0. In both cases an appropriate pulse width modulated power inverter 502 is shown controlled by a V0 regulated controller with a parallel load 506. However referring FIG. 5c where the reactive power compensation is used as an "electric spring" regulated by Vs, the active power flow 510 is shown as dissipating across non-critical load 512, the reactive controller 514 being controlled by controller 516 to regulate Vs and maintain the desired voltage across a critical load 518.

To illustrate these features of such electric spring, referring to FIG. 6a, $$P_{in} = \frac{v_o^2}{R_1} + \frac{v_S^2}{R_2} \qquad (1)$$

-continued $$= \frac{(v_S^2 - v_a^2)}{R_1} + \frac{v_S^2}{R_2}$$

$$= P_{R1} + P_{R2}$$

where $P_{in}$ in the input power from the power supply 600 such as a wind turbine, $V_S$ is the AC mains voltage regulated by controller 608, $V_0$ is the voltage across the non-critical load $R_1$ 602, $V_a$ is the voltage generated across the reactive power controller 604 (i.e. electric spring). $R_2$ is the critical load 606 that needs a stable $V_S$, $P_{R1}$ and $P_{R2}$ are the power consumed by $R_1$ and $R_2$, respectively.

In general, $P_{in}$ the power generated by a power system with substantial renewable energy sources (with intermittent nature) is not constant. It may vary according to the availability of the renewable power generated with time as shown in FIG. 6b. By using the input voltage control, the root-mean-square value of $V_S$ can be kept constant. Therefore, if $V_s$ is constant in equation (1), $P_{R2}$ is constant. $P_{R1}$ will vary to follow the profile of $P_{in}$ because the "input voltage control of $V_s$" will allow $V_a$ to fluctuate so that $P_{R1}$ becomes variable.

However it is found that in practical implementation, yet further improvements are desired.

The invention is set out in the claims.

BRIEF DESCRIPTION OF THE FIGURES

Embodiments of the invention will now be described, by way of example with reference to the accompanying figures, of which.

In overview, the invention is related to the control methods of reactive power controllers for stabilizing ac power supply. It provides a methodology for allowing reactive power controllers to work in different locations of the transmission lines of an ac power supply and for these reactive power controllers to support and stabilize the ac mains voltage levels at their respective locations of the transmission lines. The control scheme in the proposal allows these reactive power controllers to have automatically adjustable voltage references according to the mains voltage levels at the locations of the transmission lines. The control method can be applied, but not limited to, reactive power controllers embedded in smart electric loads distributed in the power grid for stabilizing and supporting the ac power supply along the transmission lines. It is a method that is useful for example for stabilizing power grids with substantial penetration of renewable power sources or weakly regulated ac power grids.

In particular, it is recognized that a control loop with a constant reference $V_{s\_ref}$ is not appropriate when more than one reactive power controller is used. A further improved control scheme is now described in order that the electric springs can work together when distributed in a power system.

Figure 7:
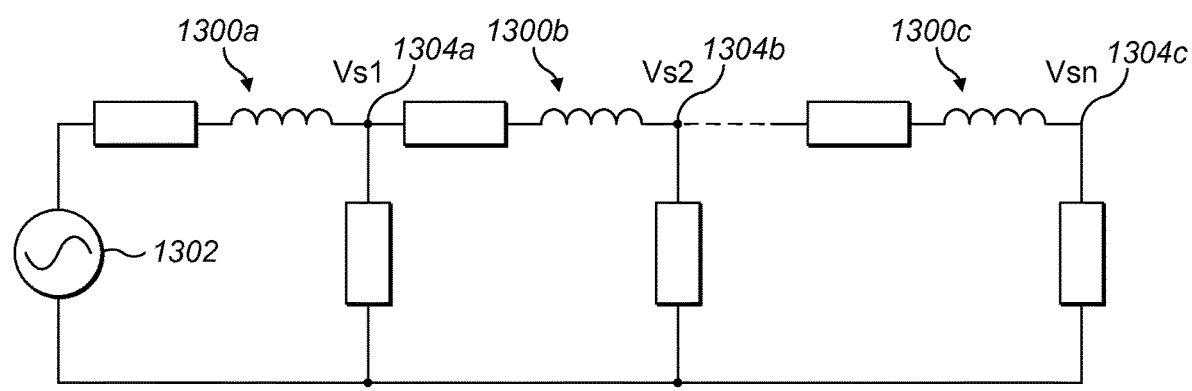
FIG. 7 shows gradual voltage drop along a transmission line.

As described above the controllers described herein can be distributed over the power grid, for embedded in electric appliances such as electric water heaters, refrigerators and road lighting systems. These are suitable "non-critical loads" that can work with a variable mains voltage. FIG. 7 shows an example of having electric loads 1300a, 1300b, 1300c connected along a transmission line. Due to the gradual voltage drop along the transmission line (i.e. voltage drops across the impedance and resistance of the transmission lines), the mains voltage levels along the lines are not identical. Generally, the mains voltage is highest at the power supply source 1302 and decreases gradually towards the end of the transmission line. The mains voltage at different locations (i.e. 1304a, 1304b, 1304c, Vs1, Vs2, . . . , Vsn etc) are not truly identical. For example, if a power transformer 1302 supplies electricity to the many houses in a residential area, the mains voltage nearest the transformer may be 230V (which is the nominal voltage) and that farthest from the transformer may be 210V, because of the voltage drop along the long electric cables along the streets. That is, it is natural that Vs1>Vs2> . . . >Vsn.

This natural phenomenon of gradual voltage change along the transmission lines implies that the use of a "single" value of the reference voltage Vs* for many controllers can be improved further. In practice, the reference voltage Vs* values of the controllers may not be set to the identical value, because the actual mains voltage values that controllers need to regulate or support are location-dependent. Therefore, a control scheme is proposed implemented in such a way that the voltage reference Vs* values are automatically adjustable to suit the actual mains voltage values at the specific locations of the electric loads in which the controllers are embedded. This invention is related to such a control scheme that enables the electric springs to have their appropriate voltage reference Vs* automatically adjustable so that they can work properly regardless of their locations along the transmission lines.

Figure 8A:
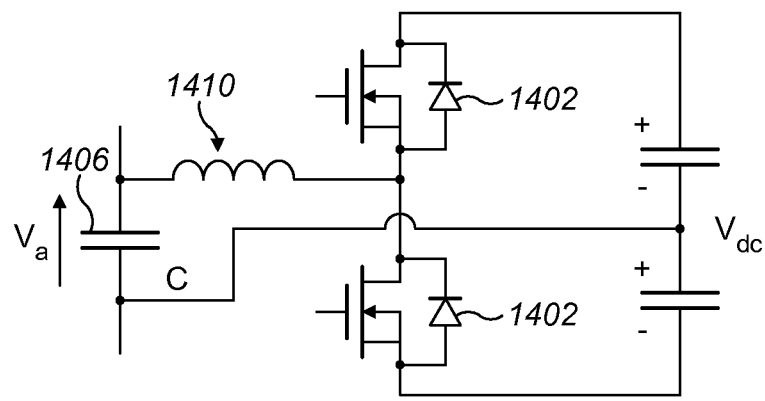
FIG. 8a shows a half bridge power invertor for a single phase application according to the invention.
Figure 8B:
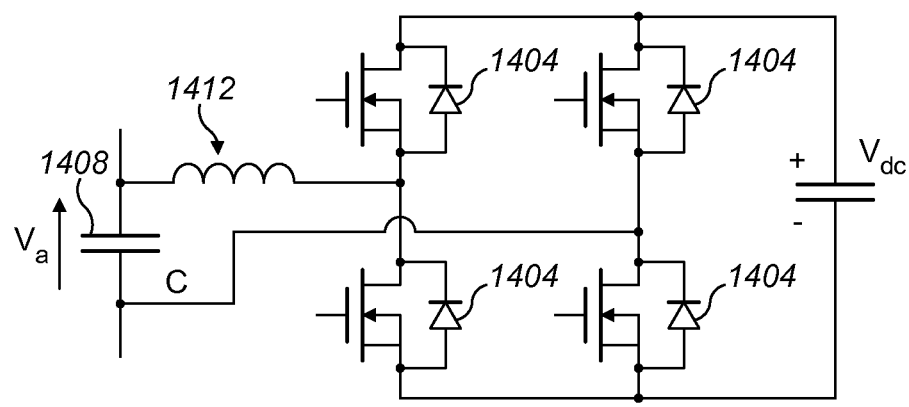
FIG. 8b shows a full-bridge invertor for a single phase application according to the present invention.
Figure 9A:
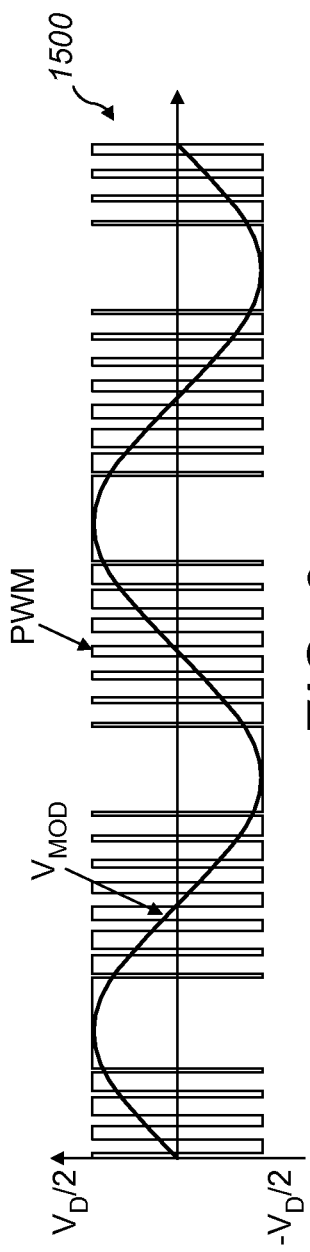
FIG. 9a, b and c show magnitude control of sinusoidal PWM switching wave forms of the invertor inventor by modulation index control for creating controllable sinusoidal output voltages after low pass filtering.
Figure 9B:
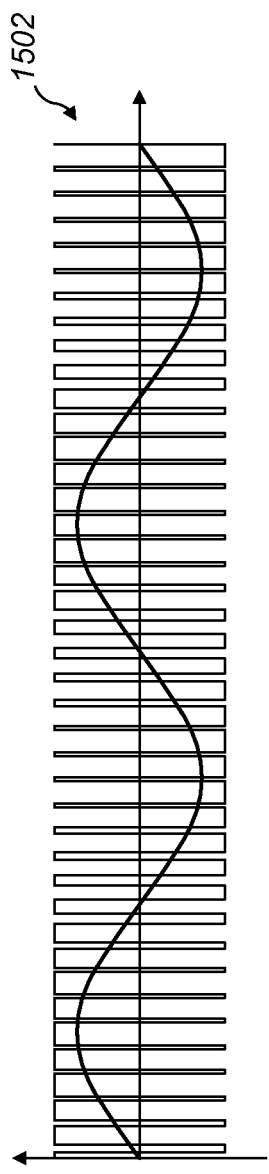
Figure 9C:
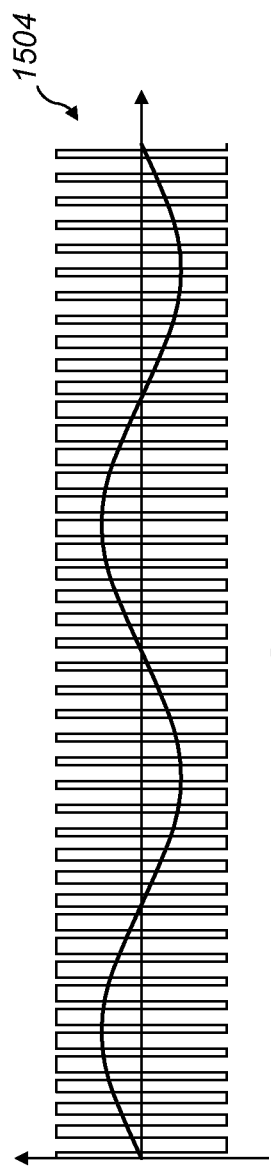

The approach is implemented in relation to the power electronic circuit of the reactive power controller described above in conjunction with an improved control scheme, using an automatically adjustable mains voltage reference Vs*. This permits mass deployment of the reactive power controllers as distributed electric springs to stabilize the power grid. FIGS. 8a and 8b show the circuits of a PWM full-bridge power inverter (FIG. 8b) and half-bridge power inverter (FIG. 8a) that can be used as the main power circuit. Diodes 1402, 1404 behave like a diode rectifier through which a dc capacitor (1406, 1408) can be charged to provide the DC voltage source for the power inverter. Referring to FIGS. 9a, 9b and 9c by controlling the modulation index (M) of the pulse-width-modulated (PWM) inverter, a high-quality PWM voltage waveform (1500, 1502, 1504) at the mains frequency can be generated. With the use of the low-pass filter (1410, 1412) comprising an inductor and a capacitor, a sinusoidal voltage ($V_a$) (1500, 1502, 1504) with controllable magnitude according to the control of the modulation index (M) at the mains frequency can be generated as the output of the LC filter, which is also the voltage provided by reactive power controller (or electric spring). In addition, the phase relationship $V_a$ with respect to $V_s$ can be controlled. In order to ensure that the power inverter acts as a reactive power controller, the vector of the current through the controller and the vector of the voltage across the controller should be ideally perpendicular to each other.

In one embodiment, in order to introduce automatically adjustable mains voltage reference into the control loop for each reactive power controller a "droop control" concept approach or its equivalent can be employed.

For example a droop control of the type used in power systems where several generators are used for power generation [B. W. Weedy & B. J. Cory, "Electric Power Systems", 4$^{th}$ Edition, New York, Wiley, 1998] or for the control of parallel power inverters [Karel De Brabandere et al, "A voltage and frequency droop control method for parallel inverters", IEEE Transactions on Power Electronics, Vol. 22, No. 4, July 2007, pp. 1107-1115] can be adopted. Voltage and frequency droop control methods enable the generators to work in parallel in order to be synchronized in frequency and achieve stable operation.

Surprisingly, although reactive power controllers theoretically do not handle active power, such that their behaviors are different from electric generators and power inverters, it is found that control schemes of this nature are suitable for the present invention.

Figure 1A:
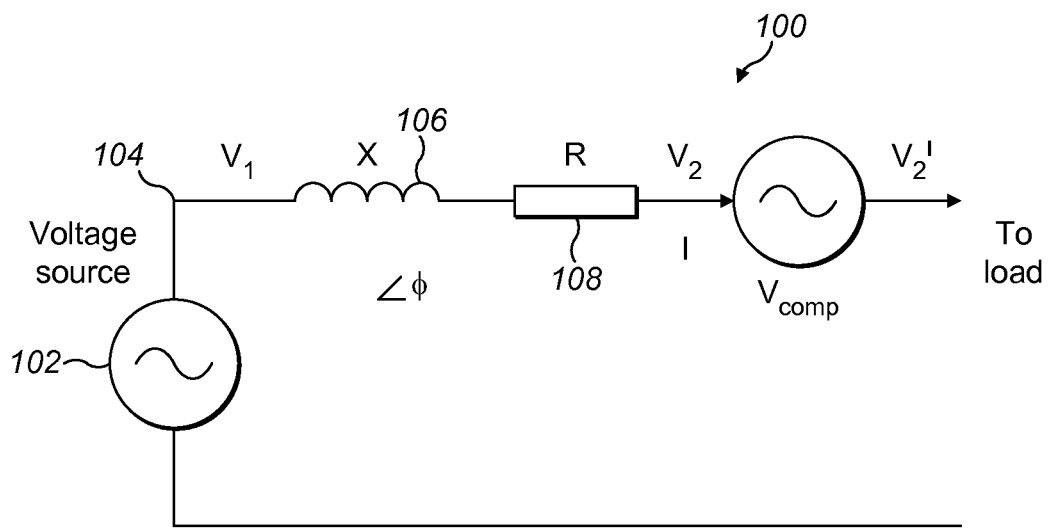
FIGS. 1a and 1b show a circuit and its equivalent vector diagram for an AC mains voltage and its transmission line impedance with series reactive power compensation according to a known arrangement.
Figure 1B:
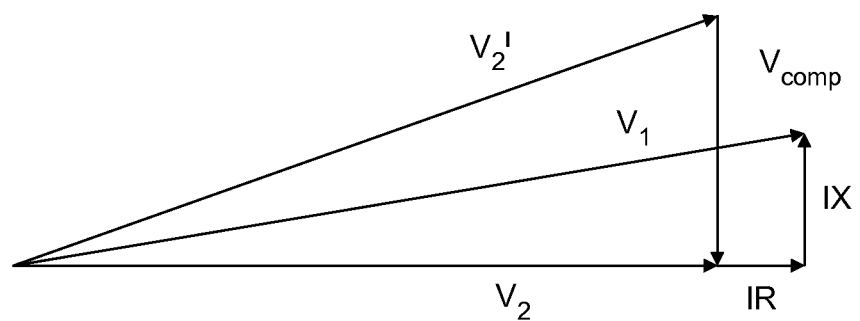
Figure 2:
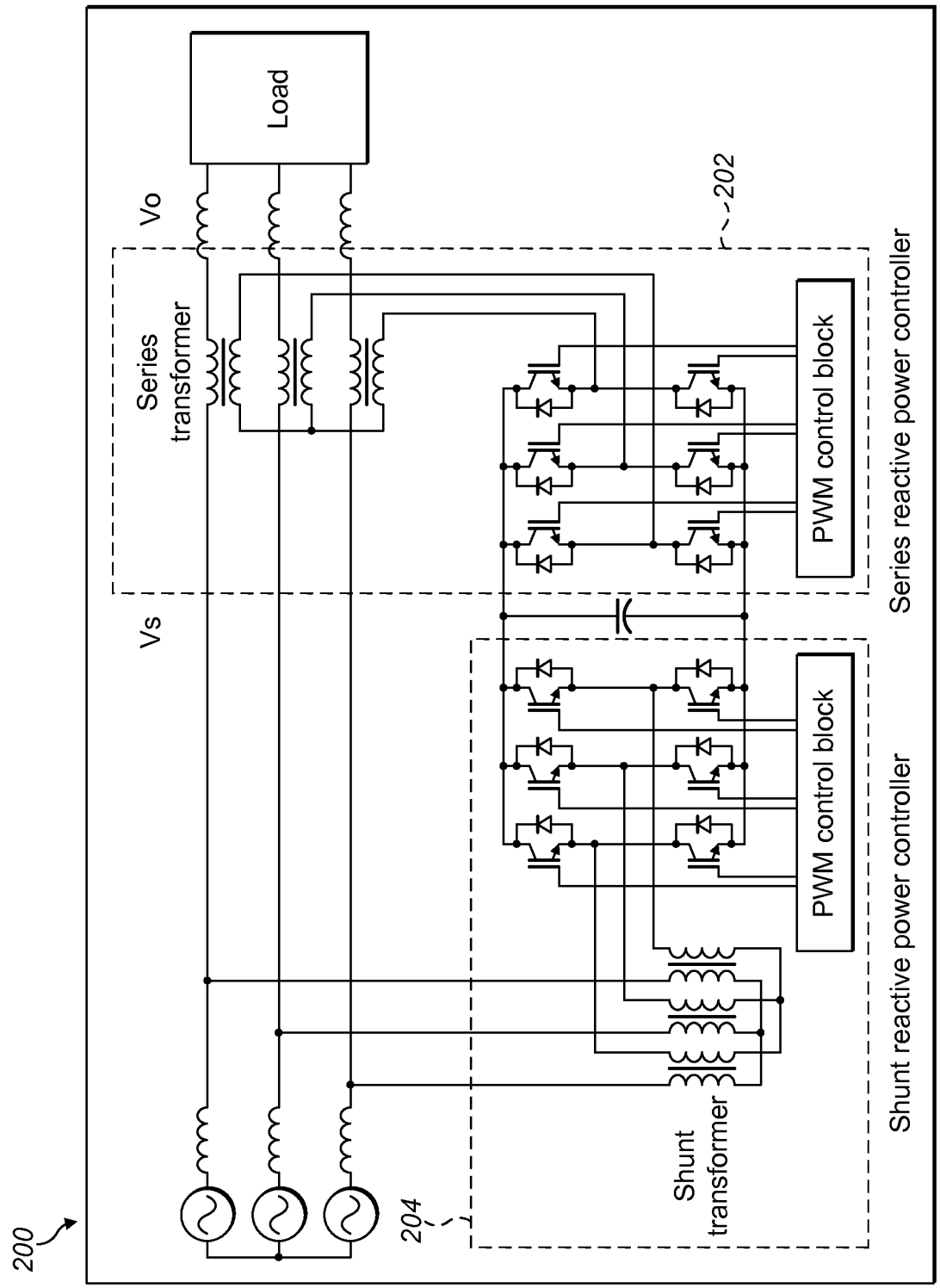
FIG. 2 shows a unified power flow controlled based on the combined use of a shunt and series reactive power controller sharing the same DC voltage source according to a known approach.
Figure 3:
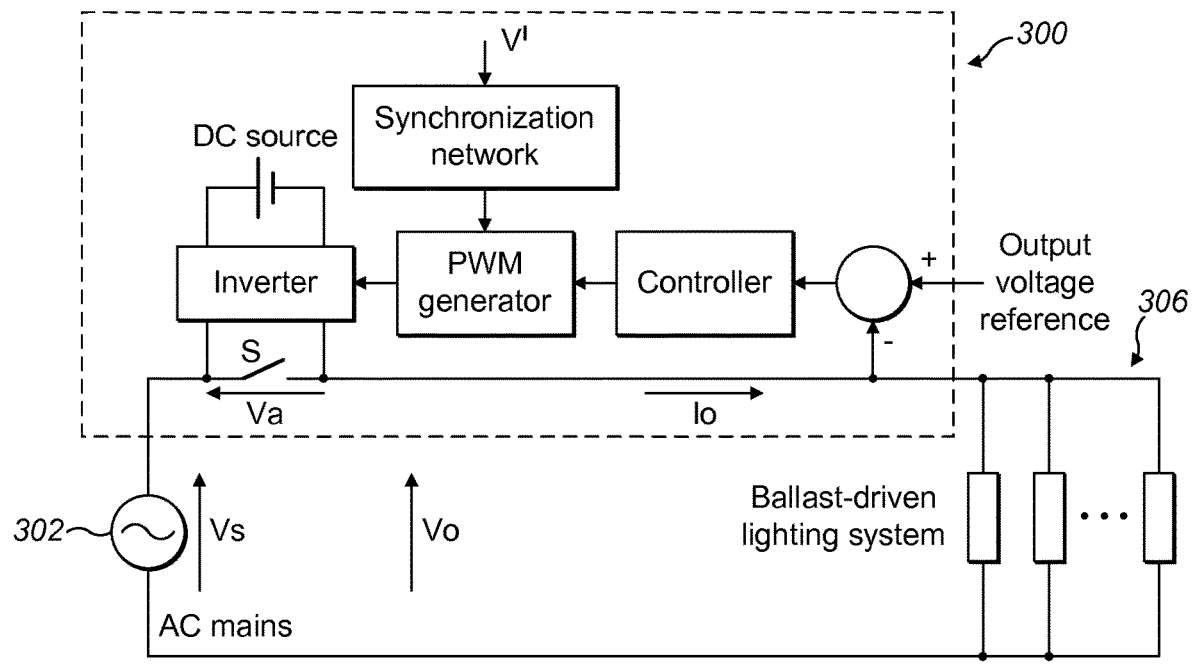
FIG. 3 is a schematic of a central dimming system for large scale lighting networks according to a known approach.
Figure 4:
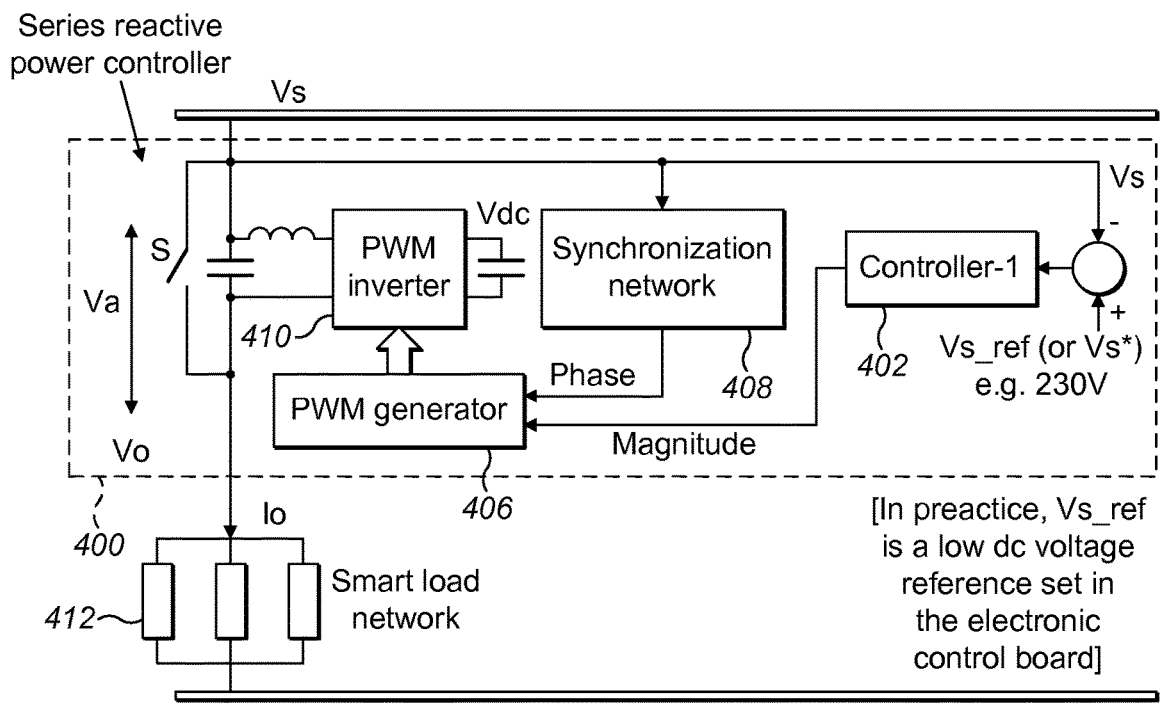
FIG. 4 shows a schematic of a proposed "series type" power line voltage controlled scheme according to a known approach.
Figure 5A:
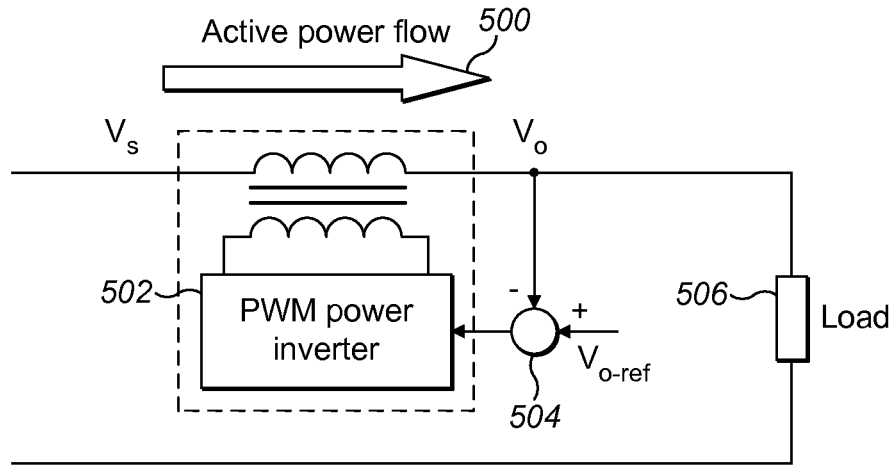
FIG. 5a shows a control schematic of a V0 regulated series reactive power compensator.
Figure 5B:
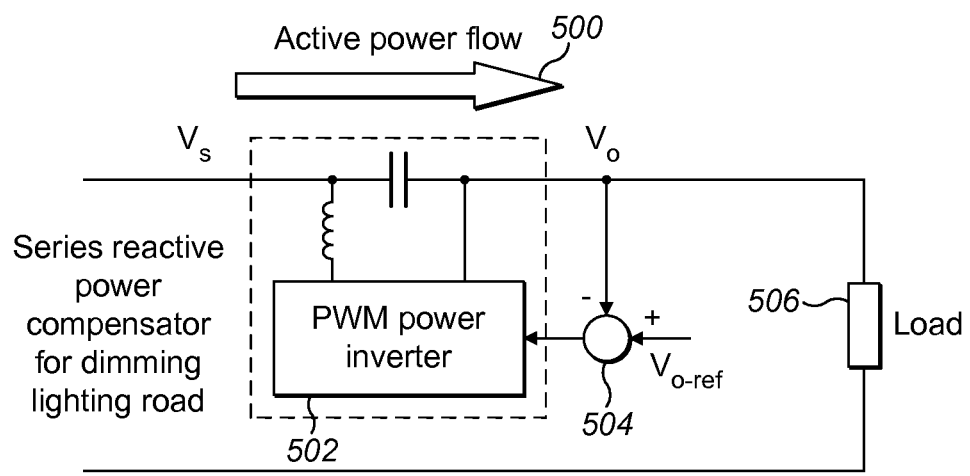
FIG. 5b shows a schematic of a V0 regulated series reactive power compensator for central dimming systems.
Figure 5C:
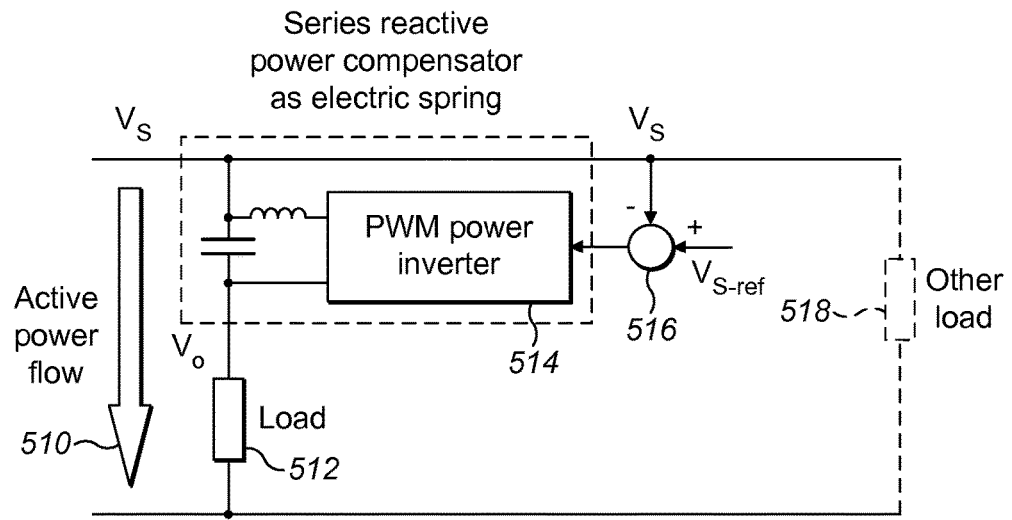
FIG. 5c shows a schematic of a Vs regulated series reactive power compensated.
Figure 6A:
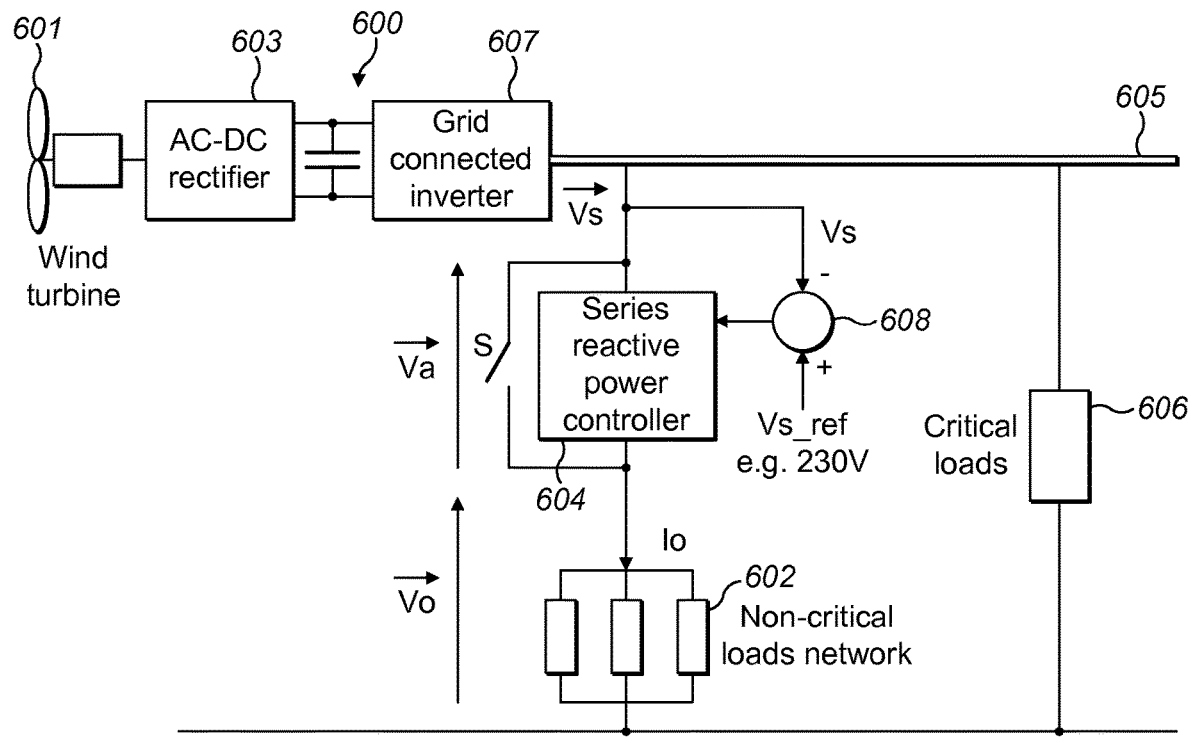
FIG. 6a shows a schematic of a series reactive power controller according to a known approach.

The manner in which Vs* can be set for individual controllers will now be described in more detail with reference to the set-up shown in FIG. 6. As can be seen in FIG. 6a power source 600 such as a wind turbine 601 is rectified at AC-DC rectifier 603 and supplies power line 605 via grid connected inverter 607. Voltage Vs across series reactive power controller 604 and load 602 allows variation of Vs across controller 604 in conjunction with Vs across load 602 to provide a desired voltage across critical load 606, by maintaining Vs at Vs-ref at controller 608.

Figure 6B:
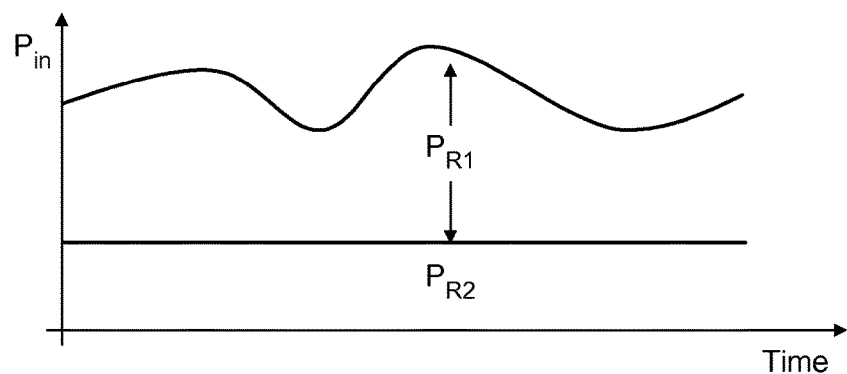
FIG. 6b shows power variation across different components.

The aim of the controller in the application example of FIG. 6 is to restore $v_s$ to the nominal value of the mains voltage $v_{s\_ref}$. Let $p_W$ be the sum of dynamically-changing wind power and a certain base power generated by an AC power source such as an AC generator. The general power balance equation for the system in FIG. 6 is:

$$P_W = \left(\frac{v_o}{Z_1}\right)^2 \text{Re}(Z_1) + \left(\frac{v_s}{Z_2}\right)^2 \text{Re}(Z_2) \qquad (2)$$

$$P_W = P_1 + P_2$$

where Re(Z) is the real part of Z that represents the resistive element R . . . $Z_1$ is the impedance of the "non-critical" load and $Z_2$ is the impedance of the "critical" load.

The vector equation for the controller (1608) is:

$$V_o = V_s - V_a \qquad (3)$$

As discussed above, equation (3) shows that, if the mains voltage is regulated by the controller at the nominal value $v_{s\_ref}$, the second power term $P_2$ should remain constant for the critical load. If the power generated Pin cannot meet the full power for both $P_1$ and $P_2$, the input-voltage control of the controller will generate a voltage vector $v_a$ to keep $v_s$ regulated at $v_{s\_ref}$. From (3), the voltage vector $v_0$ across $Z_1$ will be reduced and so the power consumption ($P_1$) of $Z_1$ will also be reduced. Therefore, if the controller performs well, $P_2$ for the critical load should remain constant as expected and $P_1$ for the non-critical load should follow the power generation profile.

Figure 10A:
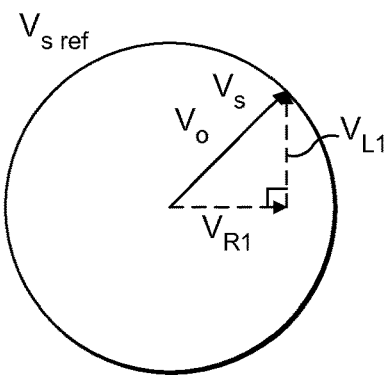
FIGS. 10a to 10d show neutral, voltage reduction, voltage boosting and voltage reduction (energy absorption) modes.
Figure 10B:
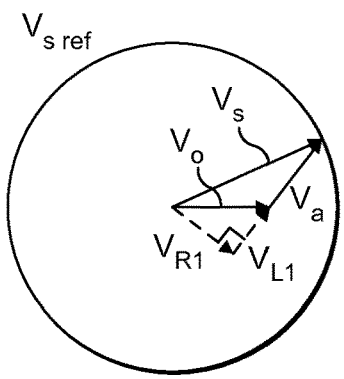
Figure 10C:
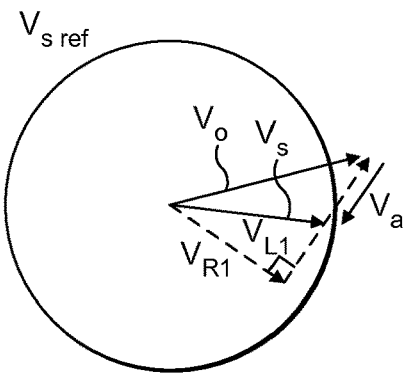

Continuing the mechanical spring analogy presented above, where such a spring cannot be extended beyond a certain displacement, controller also has its operating limit. FIGS. 10a-10d shows the vector diagrams of the system (FIG. 6) with the controller under four operating modes. The circle in the vector diagram represents the nominal value of the mains voltage $v_{s\_ref}$ (e.g. 220V). The vectors are assumed to rotate in an anticlockwise direction at the mains frequency (e.g. 50 Hz). FIG. 10a depicts the situation when the controller is in a "neutral" position in which $v_a=0$. This refers to the situation that the power generated by the renewable power source (600) (such as a wind farm) is sufficient to meet the load demand and simultaneously maintain $v_s$ at the nominal value of $v_{s\_ref}$. FIG. 10b represents the situation when power reduction in $Z_1$ is needed in order to keep $v_s$ at $v_{s\_ref}$. Here $v_a$ is positive in order to provide the "voltage boosting" function under the capacitive mode of the electric spring. If the generated power is higher than the load demand, $v_s$ will exceed $v_{s\_ref}$ resulting in an over-voltage situation. In order to regulate $v_s$ at $v_{s\_ref}$, FIG. 10c shows that the controller can provide "voltage reduction" function by operating under the inductive mode. Here $v_0$ is increased, with respect to its value in FIG. 10b, in order that the load $Z_1$ can consume more power generated by the renewable energy source to keep the power balance. The scalar equation for electric spring voltage vector $v_a$ under the capacitive mode (FIG. 10b) and inductive mode (FIG. 10c) is given (3):

$$v_a = \begin{cases} -v_c & \text{for capacitive mode} \\ +v_c & \text{for inductive mode} \end{cases} \qquad (4)$$

where $v_c$ is the voltage of the filter capacitor of the power inverter.

Figure 10D:
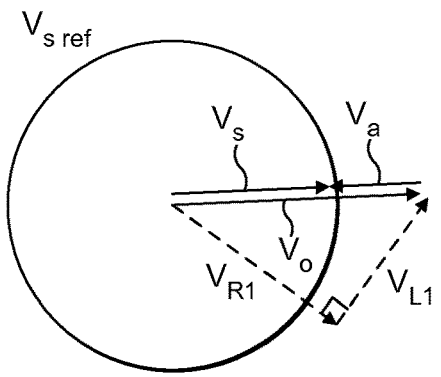

In the three operating modes described in FIGS. 10a-10c, the controller operates in a lossless manner and does not consume energy. However, if the generated power is excessive, the voltage across $Z_1$ (i.e. $v_0$) may exceed $v_{s\_ref}$ as shown in FIG. 10d, the controller cannot maintain $v_s$ at $v_{s\_ref}$ under the capacitive (FIG. 10b) and inductive (FIG. 10c) modes. Under the capacitive or inductive operating modes, the electric spring voltage vector $v_a$, which has to be perpendicular with $v_{R1}$ (or in parallel with vector $v_{L1}$) for reactive power operation, cannot touch the circle and thus reduce $v_s$ to $v_{s\_ref}$. Under this situation, the controller (1604) has to absorb real power and transfer it to somewhere else such as an energy storage element (not shown) which can be any appropriate element such as a battery through another path. In this operation in FIG. 10d, the vector $v_a$ is no longer perpendicular to $v_{R1}$. Therefore, the controller on its own without active power absorption means is more effective in voltage boosting than voltage reduction.

Figure 11:
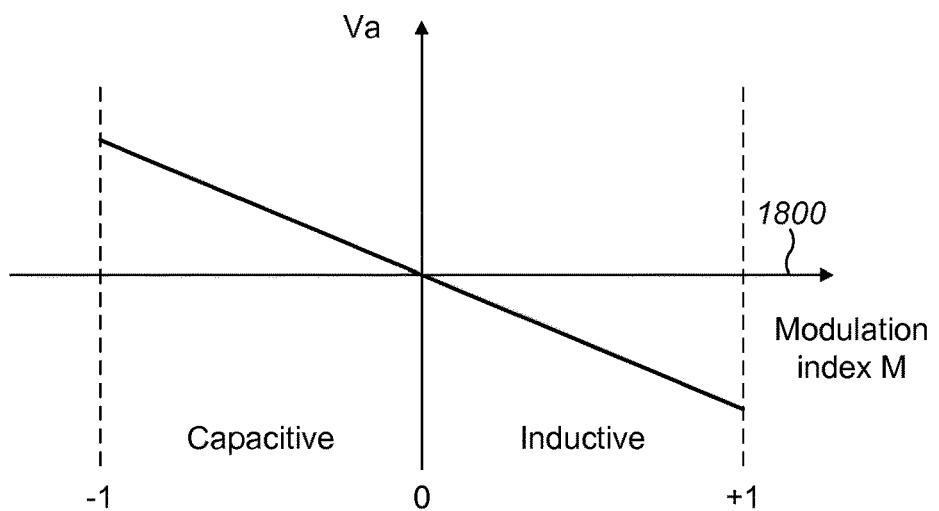
FIG. 11 shows operating modes of reactive power controllers as a function of modulation index M.
Figure 12A:
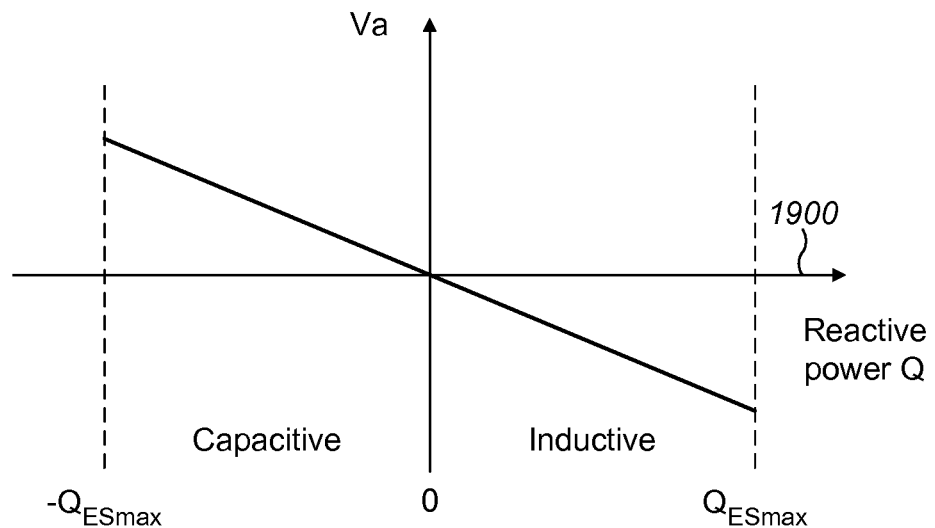
FIGS. 12a and 12b show operating modes of reactive power controllers as a function of reactive power and reduction of mains voltage along a transmission line.

It can be seen that the capacitive mode provides voltage support while inductive mode provides voltage suppression for the ac power system. Such relationship can be graphically illustrated in FIG. 11, in which the x-axis refers to the modulation (1800) of the PWM voltage, which is effectively an indication of the magnitude of the filtered sinusoidal voltage waveform generated by the controller. In physical terms, the capacitive and inductive modes can be represented as a reference to the reactive power Q provided by the controller as shown in FIG. 12a. Here, when the controller provides negative reactive power, it provides voltage support (i.e. positive Va). When it provides positive Q, it generates negative Va.

Figure 12B:
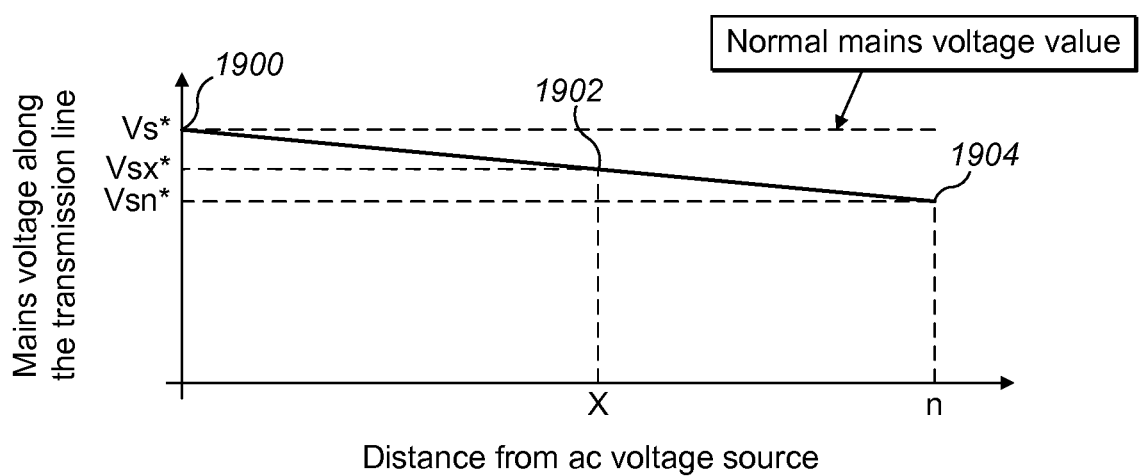
Figure 13:
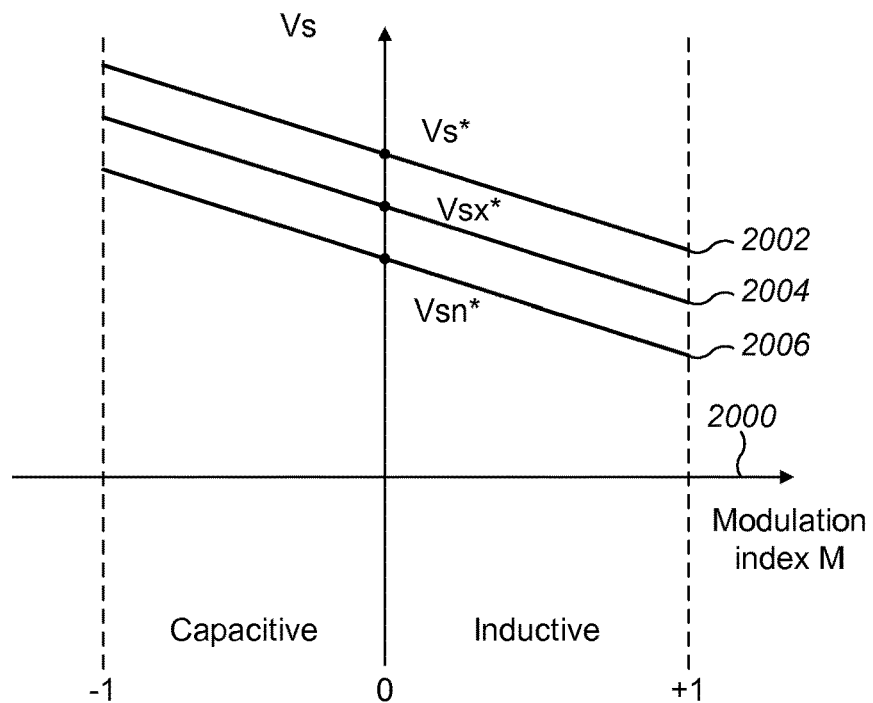
FIG. 13 shows ideal characteristics of reactive controllers according to the invention located in different positions along the transmission line.
Figure 14:
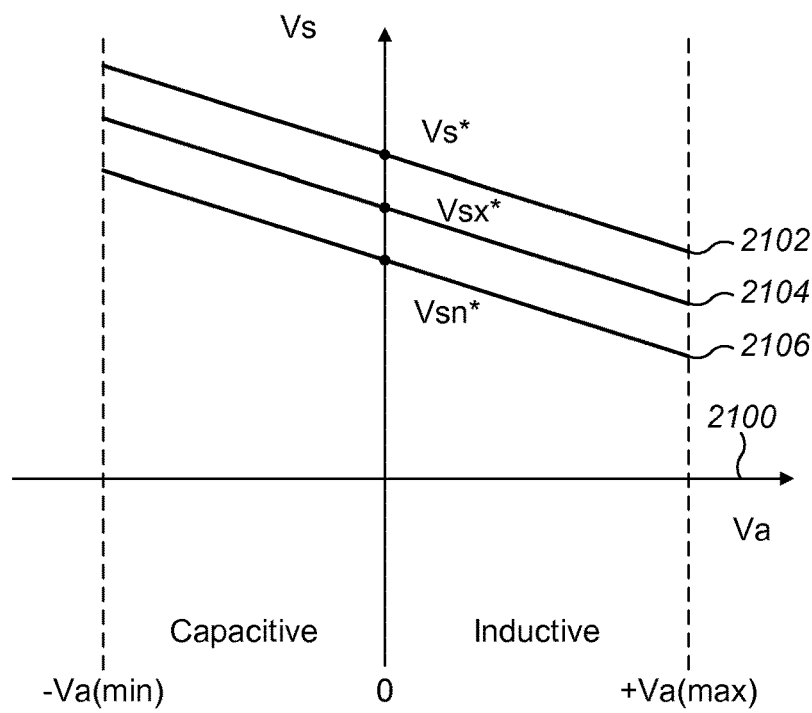
FIG. 14 shows the ideal characteristics of reactive controllers located in different positions along the transmission line as a function of voltage.

As discussed above, due to the fact that (i) these controllers will be distributed and installed in different locations along the transmission lines and (ii) there is voltage drop along the transmission lines, the exact mains voltage reference values that these controllers need to maintain as their respective reference values are location-dependent and therefore not identical. As shown in FIG. 12b, the reference mains voltage for the controller installed immediately next to the ac voltage source (that may come from a step-down transformer) is Vs* 1900. For a controller installed at a distance x from the ac voltage source, the mains voltage reference may drop to Vsx* 1902. For a further installation at the end of the transmission line (i.e. distance n) from the ac voltage source, such mains voltage reference will be reduced to a lower value Vsn* 1904. Therefore, the voltage droop characteristics of these three controllers are similar in nature, but different in values of the mains voltage references as indicated in FIG. 13 (modulation index M (2000), and corresponding Vs* (2002), Vsx* (2004) and Vsn* (2006)) and FIG. 14 (Va (2100), and corresponding Vs* (2102), Vsx* (2104) and Vsn* (2106)).

Figure 15:
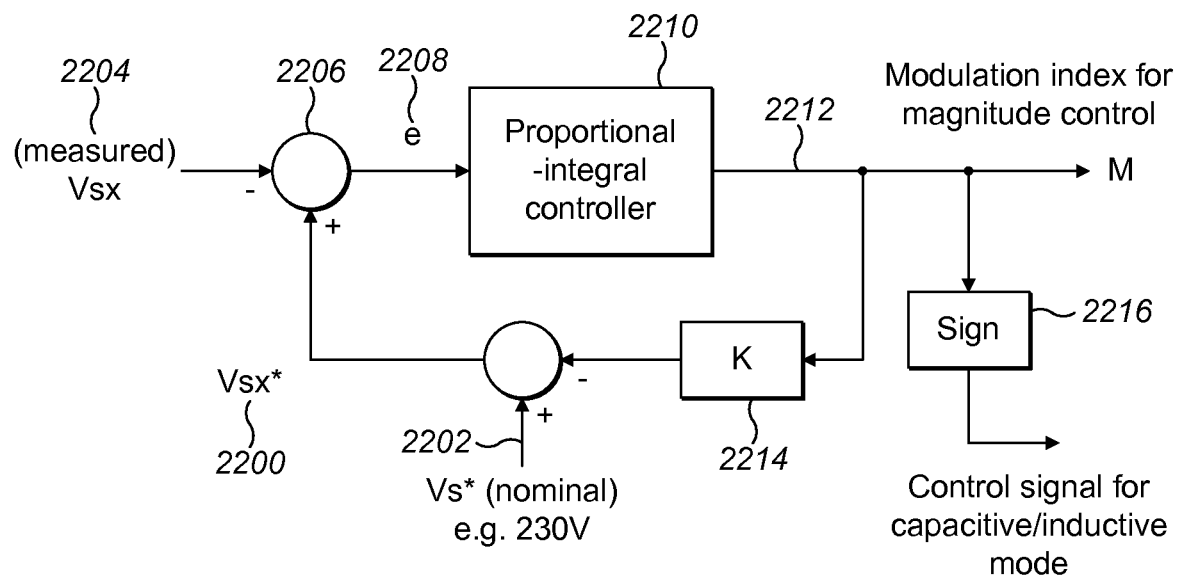
FIG. 15 shows a control scheme for providing an automatically adjustable reference voltage.
Figure 16:
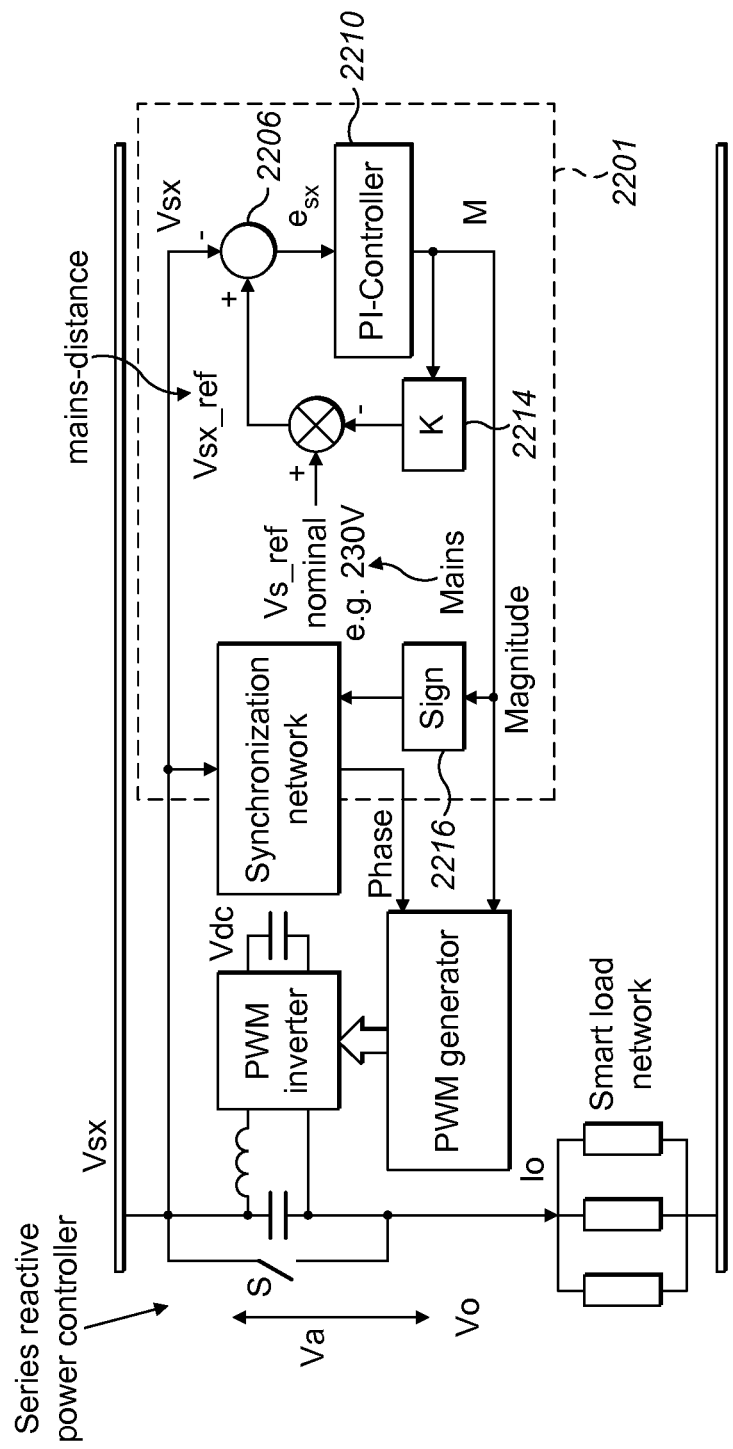
FIG. 16 shows a control scheme for reactive controllers with automatically adjustable mains voltage reference for the location along the transmission line.

With reference to FIG. 15, in order to enable each controller to produce an automatically adjustable mains voltage reference value Vsx* (2200) for a nominal mains voltage Vs* (2202) (e.g. 230V), a control scheme that can be implemented the control board of each controller is proposed. The basic concept is illustrated by the schematic of control block as shown in FIG. 16 as an example. It should however be stressed that other control blocks with the same control objectives can also be used. The control scheme can be implemented in analogue or digital form, or a combination of both.

Without loss of generality, the controller is assumed to be installed at a distance x from the ac voltage source which has a "nominal" mains voltage Vs* (2202) (e.g. 230V or 110V). This electric spring is connected to the mains voltage at which the actual (measured) mains voltage is Vsx (2204). The control scheme generates an adjustable reference voltage Vsx* (2200), which suits the actual mains voltage at location-x of the transmission or distribution lines. The measured Vsx (2204) is subtracted from the Vsx* (2200) at subtractor (2206) and the difference or error signal e (2208) is fed to a proportional-integral (PI) controller (2210). The output of the PI control is the modulation index (M) (2212). M is fed to a gain (2214) K and the signal MK is subtracted at the subtractor (2206) from the nominal mains voltage (2202) Vs* to form the generated adjustable mains voltage reference Vsx*. The polarity of M provides a control signal (2216) for the capacitive mode or inductive mode of operation.

The principle of the control scheme can be illustrated with the following control equations:

$$v_{SX}^* = v_S^* - MK \quad (5)$$

$$e = (v_S^* - MK) - v_{SX} \quad (6)$$

Equation (5) indicates that the adjustable mains voltage reference Vsx* depends on the droop characteristic which is represented by the constant gain K. Since M is a variable, the −MK term on the right-hand side allows this reference voltage to be adjusted according to the voltage drop along the transmission lines.

Since the function of the PI-controller is to keep the error signal (e) to zero, equation (6) shows that the operation of the control scheme is to force the measured Vsx to approach the automatically adjustable reference Vsx*.

The equation for the modulation index M is:

$$M = k_p(e) + k_1 \int(e) dt \quad (7)$$

where $k_p$ is the proportional coefficient and $k_1$ is the integral coefficient of the PI controller.

Of course it will be recognised that other control scheme can be adopted and the P1 controllers are merely one possible implementation for achieving the control equations (5), (6).

Therefore, it is proposed in this invention that the control scheme previously suggested in FIG. 6a be modified to the control scheme indicated in the dotted box of FIG. 16. In this way, many electric springs can work independently and also in group regardless of their installation locations in the power grid.

As can be seen in FIG. 16, the controller of FIG. 15 is provided as controller 2201. As discussed, the control scheme allows control of the voltage across the reactive controller to compensate for droop in the voltage at the location of the controller. Hence instead of tracking the voltage at the origin of the power transmission line the corrected reference voltage of the relevant location is correct. Selection of the gain value K allows the droop characteristic to be incorporated.

The gain value of K can be preset per device, set at installation or can be remotely set for example via wired or wireless means across a distributed network. Control schemes and approaches to setting the reference voltage value can be adopted as appropriate.

In practice the proposed control scheme provides additional benefits. Using the controller but without using the proposed control scheme, it is important to note that the most upstream controller provides maximum positive reactive power (i.e. maximum and positive Qa1), meaning that it is operating in its inductive mode to "suppress" its mains voltage at a nominal level Vs1. At the same time, the most downstream controller operates mainly in the capacitive mode by generating primarily negative reactive power (i.e. maximum negative reactive power Qa3) to support the mains voltage Vs3, from the instantaneous value of Vs3 which stays below the nominal voltage. Therefore, it can be seen that the controllers work "against" each other, instead of cooperating "with" each other. The action of an intermediate controller fluctuates between the two extremes.

In the above example, the controllers without the proposed control scheme can still regulate the mains voltage even though some of them conflict, as the reactive power capacities are sufficient to compensate the reactive power required for the voltage regulation in the setup. However, where the reactive power capacity of the controller is smaller, this may not be possible.

Under the proposed compensation control scheme, all the controllers generate reactive power in a similar manner to compensate the voltage fluctuation. This means that they are "co-operating" to regulate the mains voltage levels at their respective locations of the transmission line.

Hence even if individual controllers may have limited reactive power capacities, the proposed control scheme enables them to work together in order to maximize their effects for reactive power compensation, which is an effective means to provide voltage regulation in power grid. While traditional reactive power controllers provide reactive power compensation only, the extra "non-critical load shedding" function of the controllers according to the invention offers automatic power flow control which brings extra benefits to frequency stability control.

It will be appreciated that the approaches described herein can be used in relation to a power transmission system of any magnitude and level of distribution and using controllers in conjunction with any appropriate non-critical load and realised in any appropriate manner permitting voltage compensation in the manner described.

Although the invention has been described with reference to specific examples, it will be appreciated by those skilled in the art that the invention can be embodied in many other forms. It will also be appreciated by those skilled in the art that the features of the various examples described can be combined in other combinations.

The invention claimed is:

1. A power compensator for compensating voltage at a location along a power transmission line, the power compensator comprising:
   a controller for controlling a voltage generated across the power compensator; and
   a reactive power compensator and means for non-critical load shedding,
   wherein the voltage is controlled to maintain a power transmission line voltage at a value dependent on a respective location along the power transmission line,
   wherein the controller comprises a proportional-integral controller configured to receive an error signal, which is based on a difference between the voltage generated across the power compensator and a desired voltage, and output a modulation index used in determining an updated value of the desired voltage,
   wherein the controller further comprises: a gain connected to the proportional-integral controller; and a subtractor connected to the gain and to the proportional-integral controller, and
   wherein the controller is configured such that the modulation index output from the proportional-integral controller is fed to the gain to produce a gain modulation signal that is subtracted at the subtractor from a nominal voltage of the power transmission line to determine the updated value of the desired voltage.

2. The power compensator of claim 1, wherein the controller is configured to provide control according to a gain value.

3. The power compensator of claim 2, wherein the gain value is locally set.

4. The power compensator of claim 2, wherein the gain value is remotely set.

5. A power compensation system, comprising: the power compensator as claimed in claim 1; and at least one load.

6. The power compensation system of claim 5, wherein the load comprises an appliance.

7. The power compensation system of claim 5, wherein the load comprises an overload load.

8. The power compensation system of claim 5, further comprising a critical load in parallel with the compensator, wherein the compensator is configured to compensate to provide voltage across a critical load at a voltage value dependent on a respective location along the power transmission line.

9. A power transmission system, comprising: a power transmission line; and a plurality of power compensators, each as claimed in claim 1, at respective locations along the power transmission line and each power compensator of the plurality of power compensators having a respective voltage value, wherein a power line transmission voltage is controlled by the plurality of power compensators.

10. The power transmission system of claim 9, wherein the power transmission line comprises a distribution line.

11. The power compensator of claim 1, wherein the voltage value is further dependent on a droop characteristic.

12. The power compensation system of claim 5, wherein the at least one load comprises a smart load network connected to the power compensator.

13. A power compensation system, comprising: the power compensator as claimed in claim 1; and a smart load network connected to the power compensator.

14. A method of providing power compensation at a respective location along a power transmission line, the method comprising:
   controlling a voltage generated across a power compensator at a respective location along the power transmission line to maintain a power transmission line voltage at a voltage value dependent on the respective location along the power transmission line; and
   shedding a non-critical load,
   wherein controlling the voltage generated across a power compensator comprises:
      receiving, by a controller, the voltage generated across the power compensator;
      generating an error signal based on a difference between the voltage generated across the power compensator and a desired voltage;
      inputting the error signal into a proportional-integral controller of the controller; and
      outputting, by the proportional-integral controller, a modulation index used in determining an updated value of the desired voltage;
      feeding the modulation index output from the proportional-integral controller to a gain of the controller to produce a gain modulation signal; and
      subtracting, at a subtractor of the controller, the gain modulation signal from a nominal voltage of the power transmission line to determine the updated value of the desired voltage.

15. The method of providing power compensation of claim 14, wherein controlling the voltage value is further dependent on a droop characteristic.

16. The method of providing power compensation of claim 15, the method further comprising: providing the power compensator; and connecting the power compensator to at least one load.

17. The method of providing power compensation of claim 16, further comprising connecting the power compensator to at least one non-critical load.

18. The method of providing power compensation of claim 16, wherein the at least one load comprises a smart load network.

\* \* \* \* \*